United States Patent [19]

Nemeth

[11] Patent Number: 5,088,324
[45] Date of Patent: Feb. 18, 1992

[54] COMBINED LIQUID-LEVEL AND CONDUCTIVITY SENSOR

[75] Inventor: Frank A. Nemeth, Harwinton, Conn.

[73] Assignee: Imo Industries, Inc., Princeton, N.J.

[21] Appl. No.: 666,265

[22] Filed: Mar. 8, 1991

[51] Int. Cl.$^5$ .................. G01F 23/02; G01N 21/41
[52] U.S. Cl. .............................. 73/291; 73/293; 250/577
[58] Field of Search ............... 73/291, 293; 250/577

[56] References Cited

U.S. PATENT DOCUMENTS

| | | | |
|---|---|---|---|
| 4,645,095 | 2/1987 | Coppola | 73/304 R X |
| 4,713,552 | 12/1987 | Denis et al. | 250/577 |
| 4,840,137 | 6/1989 | Beauvais et al. | 73/293 X |
| 4,974,448 | 12/1990 | Icking | 73/304 R |
| 4,979,797 | 12/1990 | Nemeth | 250/577 X |
| 4,988,975 | 1/1991 | Nap | 73/304 R |
| 4,989,452 | 2/1991 | Toon et al. | 250/577 X |

*Primary Examiner*—Daniel M. Yasich
*Attorney, Agent, or Firm*—Hopgood, Calimafde, Kalil, Blaustein & Judlowe

[57] ABSTRACT

The invention contemplates a sensor head which senses liquid conductivity as well as liquid level. An optical prism is configured to provide two internal reflections of light entering on a first-axis alignment of 45° incidence for the first internal reflection, and exiting the prism on a second-axis alignment that is parallel to and spaced from the first-axis alignment. The internal reflections may occur in a conical-prism configuration having a geometric apex angle of 90°, or in a triangular-prism configuration wherein two surfaces converge at 90°. In either case, these internal reflections occur substantially in the single geometrical plane that is defined by the first and second axes. As a matter of structural practicality, each of these prism alternatives has greater body bulk, on both sides of this single geometric plane, than is needed for the indicated internal relfections. For conductivity-sensing purposes, the invention uses this bulk, on opposite sides of the plane of internal reflections, to position two spaced electrodes, for external exposure at substantially the level of the internal reflections but at lateral offset from the plane of the reflections. Electronic circuitry associated with the prism serves the light-source and photodetection purposes of liquid-level response, in addition to serving the conductivity response, if any, of electrode exposure to immersing liquid.

10 Claims, 1 Drawing Sheet

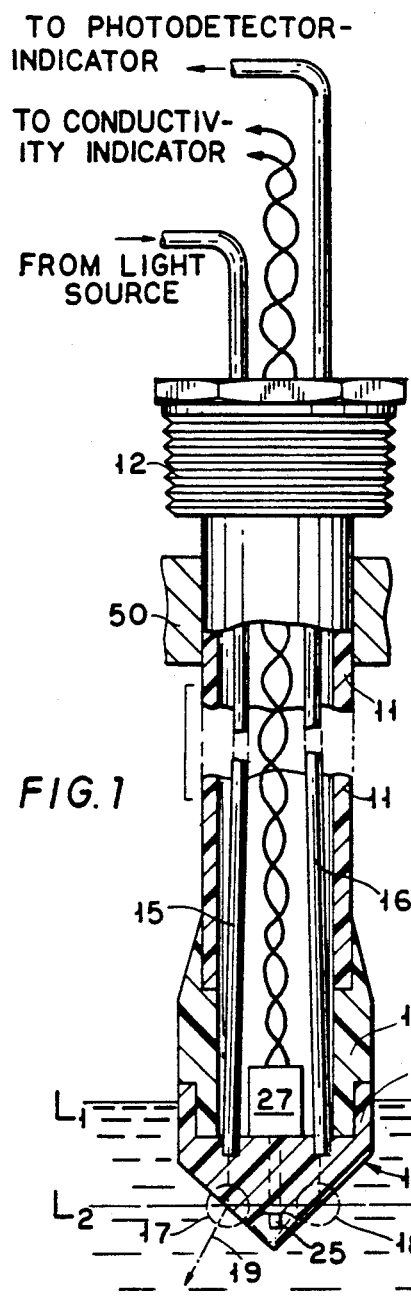
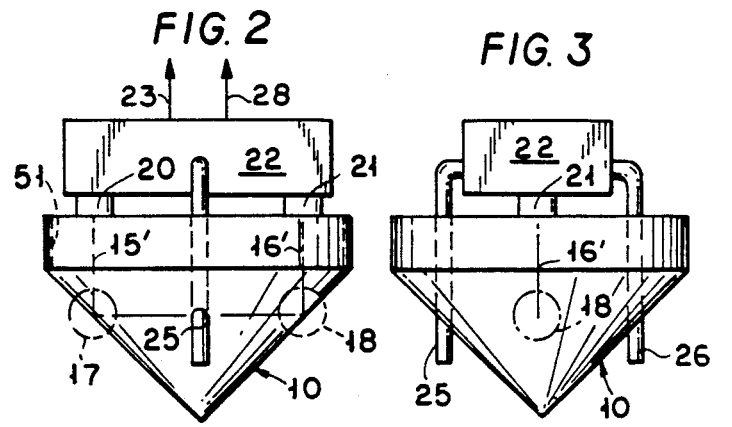
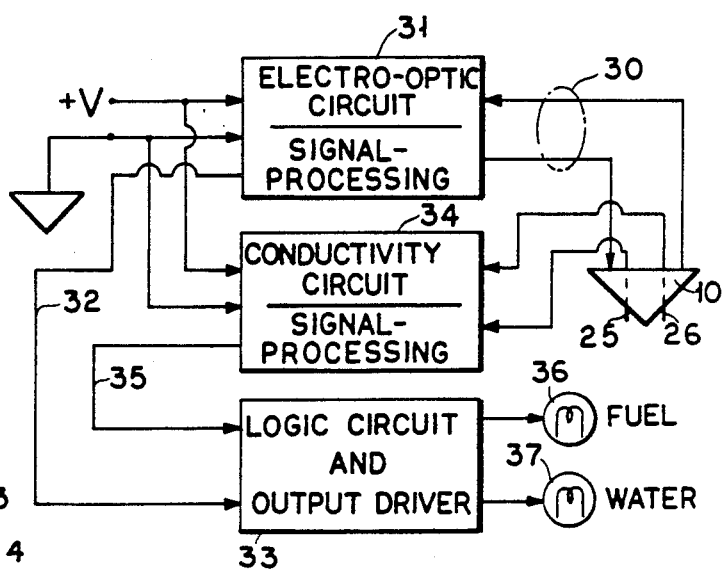
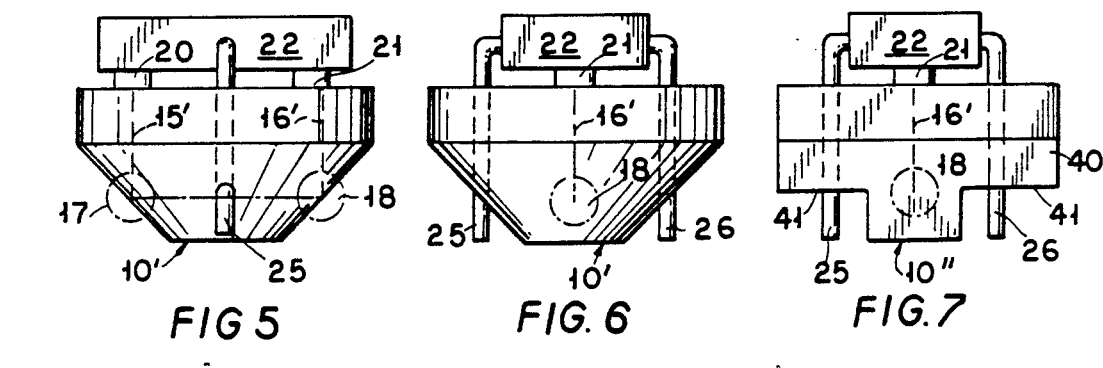

COMBINED LIQUID-LEVEL AND CONDUCTIVITY SENSOR

BACKGROUND OF THE INVENTION

The invention relates to opto-electronic means of detecting whether liquid is present at a given level within a tank or reservoir and, concurrently, for sensing conductivity at that level, whereby to distinguish between the presence of an electrically conductive or non-conductive liquid at that level.

U.S. Pat. No. 4,979,797 is illustrative of the state of the art of opto-electronic means of liquid-level detection. The improvement of said patent relates to the use of plural sensor prisms and associated optical-fiber circuits arrayed as a single stem by which the individual prisms serve for response to each of a plurality of different liquid levels. Each prism is formed of light-transmitting material which can be injection-molded to precise dimensions. As long as a given prism is exposed to air, a large amount of directed light from a transmission optical fiber is transmitted (by reflection within the prism) to a receiving optical fiber; but when the prism is immersed in a liquid, a portion of the light from the transmitting fiber is refracted into the liquid, resulting in a clearly detectable decrease in the amount of light coupled to the receiving optical fiber.

But no matter how many such opto-electronic sensors are immersed in liquid, each sensor will only yield the information that it is or is not immersed in liquid. Thus, such sensors are not adapted to differentiate as between immersion in a conductive liquid such as water, or immersion in a non-conductive liquid such as gasoline. Necessarily also, such sensors cannot respond to a changed immersion, as from immersion in a non-conductive liquid, to immersion in a conductive liquid, or vice versa.

BRIEF STATEMENT OF THE INVENTION

It is an object to provide an improved liquid-level sensor which has the ability to differentiate as between the electrically conductive or non-conductive property of liquid at the level of sensor-immersion in the liquid.

A specific object is to meet the above object with a unitary sensor device, complete with its own electronic circuitry and with signal output that is suitable for remotely communicating the instantaneous status of sensor exposure, namely: (a) whether or not exposed to (i.e., immersed in) a liquid, and (b) whether or not the exposure is electrically conductive.

The invention achieves these objects in a sensor head which incorporates an optical prism configured to provide two internal reflections of light entering on a first-axis alignment of 45° incidence for the first internal reflection, and exiting the prism on a second-axis alignment that is parallel to and spaced from the first-axis alignment. The internal reflections may occur in a conical-prism configuration having a geometric apex angle of 90°, or in a triangular-prism configuration wherein two surfaces converge at 90°. In either case, these internal reflections occur substantially in the single geometrical plane that is defined by the first and second axes. As a matter of structural practicality, each of these prism alternatives has greater body bulk, on both sides of this single geometric plane, than is needed for the indicated internal reflections. For conductivity-sensing purposes, the invention uses this bulk, on opposite sides of the plane of internal reflections, to position two spaced electrodes, for external exposure at substantially the level of the internal reflections but at lateral offset from the plane of the reflections. Electronic circuitry associated with the prism serves the light-source and photodetection purposes of liquid-level response, in addition to serving the conductivity response, if any, of electrode exposure to immersing liquid.

DETAILED DESCRIPTION

Preferred embodiments of the invention will be described in detail, in conjunction with the accompanying drawings, in which:

FIG. 1 is a fragmentary view in elevation of a combined liquid-level and conductivity sensor of the invention, assembled to supporting structure and immersed in liquid, and shown partly broken-away and in section;

FIG. 2 is an enlarged view in elevation of a sensor as in FIG. 1, united with its own packaged electronic circuitry;

FIG. 3 is an elevation view similar to FIG. 2 but taken from an orthogonally related viewing aspect;

FIG. 4 is an electrical block diagram of functional components of circuitry for FIGS. 2 and 3;

FIG. 5 is a view similar to FIG. 2, for a modification;

FIG. 6 is a view similar to FIG. 3, for one alternative for the construction of FIG. 5; and FIG. 7 is a view similar to FIG. 3, for another alternative for the construction of FIG. 5.

In FIG. 1, a sensing head 10 of the invention is shown assembled to supporting structure comprising an elongate tube 11 with suitable means, such as a threaded bushing 12, for mounting the same for suspension from the top of a tank (not shown) containing liquid; an adapter 13 connects head 10 to the the lower end of tube 11, and the head 10 is immersed in liquid, to a level $L_1$. Head 10 is essentially an optical prism, being a molded product of transparent plastic, and shown as a cone with a 90° apex angle and as having a short annular skirt 14 for purposes of assembly to the adapter 13. Spaced optical fibers 15, 16 are fitted to a pair of bores in the prism 10; these bores are short and are on diametrically opposed axes that are parallel to the central axis and are thus in diametrically opposed symmetry with respect to the conical axis of head 10.

As shown by legend, light from a suitable source is conducted by optical fiber 15 for downward transmission within the head to a local region 17 of internal 45° incidence with the conical surface of head 10. For simplicity in the drawing, the region 17 is shown with exaggerated size and phantom circular outline. If the head 10 were suspended in open air (i.e., without liquid immersion) the described internal incidence would develop a first internal reflection that is substantially horizontal and directed through the conical axis, to a second local region 10 of internal 45° incidence with the conical surface of the head; the result is a second internal reflection, with sufficient intensity on the alignment axis of optical fiber 16 to produce a remote photodetector response and indication (i.e., a "no-liquid" indication). On the other hand, the sensor head 10 happens to be shown liquid-immersed, so that the index of refraction of head-10 material and the index of refraction of the liquid are much more closely alike than was the case without liquid immersion. The light delivered by optical fiber 15 thus encounters almost complete transparency at region 17 and is therefore subjected to little or no reflection but rather to a slightly refracted exiting passage into the liquid medium, as suggested at 19; to the extent that a small fraction of light incident upon region 17 is reflected to region 18, a further fraction refractively exits for dissipation in the liquid, thus reducing to near-zero any detectable light transmission in optical fiber 16, with resulting "liquid immersion" indication from the photodetector.

The modification of FIGS. 2 and 3 is simplified as compared to FIG. 1, in that the transparent prism head 10 directly mounts electrical components serving the head. For level-sensing purposes, these components comprise a light source 20 such as a light-emitting diode (LED), delivering light on axis 15' into the volume of the head with successive, internal reflections, at 17, 18 and back to alignment 16' for photodetector response at 21. Electronics operative on the photodetector output is contained in a package 22 mounted to or integrated with the head 10, to produce an output signal for remote indication, as suggested at 23.

From the respective orthogonal elevation aspects of FIGS. 2 and 3, it is seen that for double internal-reflection purposes, whether served by optical fibers 15, 16 or by a directly mounted source 20 and photodetector 21, the optical system for responding to the presence or absence of a liquid immersion utilizes essentially only the geometrical plane defined by the two symmetrically opposed parallel axes of light entry into and exit from the head 10. This leaves substantial bulk of the body of head 10, on each lateral side of this geometrical plane. In accordance with the invention, this additional bulk, not needed for optical purposes, is used for mounting two spaced electrodes 25, 26 of an electrical-conductivity measuring system. In FIG. 1, this measuring system is served by an electronics package 27 mounted to head 10 and having output-lead connection 28 to a suitable indicator; and in FIGS. 2 and 3, the electrical-conductivity measuring system is part of the contents of the package 22 which serves the optical system. In both cases, since head 10 is advisedly an injection-molded plastic component, it is convenient that the electrodes be integrated into head 10 in the process of molding the same. In both cases, the process leaves exposed electrode material projecting outward of the head, and in the case of FIGS. 2 and 3, the electrodes are initially bent for potted integration into the electronics package 22, the potting operation being preferably after forming the head with both electrodes 25, 26 in place. Whether the two electrode elements 25, 26 are integrated with head 10 in an injection-molding procedure, or are otherwise assembled to head 10, they effectively fill and are located by a second pair of bores which extend through head 10 on diametrically opposed axes that are parallel to the central axis.

In the schematic electrical circuit diagram of FIG. 4, the liquid-level optical supply to and output from prism 10 proceeds, via means 30 which may either be direct or via optical fibers, to electro-optic signal-processing means 31, having an output 32 characterized digitally as either a voltage E, or zero volts; this output is provided to a logic circuit 33. At the same time, the electrodes 25, 26 are connected to a conductivity circuit 34 which includes signal-processing means having an output 35 characterized digitally as either a voltage E or a zero volts, according to whether the liquid is or is not sensed to be conductive; this output is provided as a separate input to the logic circuit 33, which includes an output drive for activating remote electrical indicating means, namely, a first lamp 36 which illuminates to display the existence of a first immersing liquid that is non-conductive, illustratively labeled "FUEL", or a second lamp 37 which illuminates to display the existence of a second immersing liquid that is electrically conductive, illustratively labeled "WATER", and if a double reflection is sensed at 10, 31 (meaning no liquid immersion at the operative tank level of head 10), then neither of the lamps 36, 37 will be illuminated.

In the embodiment of FIGS. 5 and 6, it is seen that the optically used apex of the convergent head slopes used for double-internal reflection have been truncated by a bottom-surface formation 10' which has no optical purpose to serve. The truncation 10' does however make for a more direct path between exposed lower ends of electrodes 25, 26. FIGS. 5 and 6, taken together, show the truncated head to be basically a frustum of a cone having the geometric apex angle of 90°. On the other hand, FIGS. 5 and 7, taken together, show the head, truncated at 10", to be basically a right triangular prism with a geometric angle of 90° between opposed convergent surfaces, one (40) of which is visible in FIG. 7. FIG. 7 also shows that for optimum external exposure of the lower ends of electrodes 25, 26, the optically unused body of the triangular-prismatic head is cut away at like lateral offsets 41 and at substantially the level of double-reflection capability, whereby to afford electrode exposure to liquid at a level which is consistent with the level of optical response to liquid immersion. It will be noted that provision of cut-away offsets 41 in no way impairs the optical-response capability of the sensor of FIG. 7.

The described combined liquid-level and conductivity sensor will be seen to meet the stated objects and to provide a simple instrumentality whereby, not only can one determine the nature and level of the particular contents of a given tank having unknown liquid contents at that level (e.g., answer to the question: Does an oil tanker's bunker contain water or gasoline at the immersion level?), but one can also determine the level at which a stratum of non-conducting lesser-density liquid (e.g., a fuel) floats on a lower stratum of greater-density conductive liquid (e.g., water). Thus, if in the case of FIG. 1, the fitting 12 is secured to an actuator for selective vertical positioning of the sensor head 10 within a tank, as in the circumstance of tube 11 having a vertically guided fit to a fixed element 50 (suggested by local hatching) a descending stroke of the positionable unit (10, 11, 12) will produce illumination of lamp 36, upon entry of regions 17, 18 into the less-dense, non-conductive liquid (e.g., the stratum of thickness $\Delta H$) which interfaces with air at level $L_1$. Then, with continuing descent of unit 10, 11, 12, entry through the interface level $L_2$ between non-conducting and conducting liquid will be indicated when head regions 17, 18 enter the liquid volume (of thickness H) beneath the interface level $L_2$, such entry being signalled by extinction of lamp 36 and illumination of lamp 37.

Various configurations of unit-handling sensor-unit connection may be adopted for integration into given suspension-tube configurations. Thus, the device of FIGS. 2 and 3 may be considered as a self-contained unit, complete with its own electronics package 22 which may utilize microchip technology, having the functions discussed in connection with FIG. 4, and having flexible electrical-cabling as necessary to serve power input of voltage $+V$, and lamp-driver output to the remote-indicating lamps 36, 37. Such a self-contained unit may be externally threaded, as suggested by dashed lines 51 in FIG. 2, at the cylindrical body portion of head 10, or this portion of the head may be otherwise characterized for a particular fit to supporting tube structure.

What is claimed is:

1. A unit-handling sensor component for use in optically detecting the presence or absence of liquid at a given elevation and for use in electrically determining the conductivity of such liquid as may be determined to exist at said elevation, said component having a body of light-transmitting material adapted for suspension on a central axis in vertical orientation, said body having an exterior profile reduction which is downwardly convergent at least at spaced locales which are at equal but opposite offset from said central axis, the geometric apex angle of downward convergence being 90 degrees, the upper end of said body having a pair of upwardly open like bores sized for optical-fiber reception and located on diametrically opposed axes that are parallel to said central axis, the geometric downward projection of each of said bore having incidence with a different one of said spaced locales, whereby light entering said body on one of said opposed axes will be reflected in essentially a single radial plane from one to the other of said locales in the absence of liquid immersion of said locales, and a pair of like conductivity-sensing electrode elements extending from the upper end of said body downwardly and completely through said body on diametrically opposed axes that are parallel to said central axis, said pair of electrode elements having emergent exposure from said body at substantially said radial plane, the diametrically opposed axes of said upwardly open bore defining a first geometric plane and the diametrically opposed axes of said electrode elements defining a second geometric plane that is approximately normal to said first geometric plane.

2. The sensor of claim 1, in which said profile reduction is conical about the central axis.

3. The sensor of claim 2, in which said profile reduction is truncated at a geometric plane normal to the central axis and at a location beneath said locales.

4. The sensor of claim 1, in which said profile reduction is via flat surfaces which converge with said geometric apex angle.

5. The sensor of claim 4, in which said profile reduction is truncated at a geometric plane normal to the central axis and at a location below said locales.

6. A unit-handling combined liquid-level and conductivity sensor, comprising a body of light-conducting material having a central axis, said body having an exterior profile reduction which at its lower end is convergent at least at spaced locales which are at equal but opposite offset from said central axis, the geometric angle of downward convergence being at 90 degrees, a light source and a photocell carried at the upper end of said body and respectively positioned for light transmission and for light detection on a first pair of diametrically opposed axes that are parallel to said central axis and at equal offset therefrom, each of said diametrically opposed axes being aligned for incidence with a different one of said spaced locales, whereby light entering said body on one of said opposed axes will be reflected in essentially a single radial plane from one to the other of said locales in the absence of liquid immersion of said locales, and conductivity-sensing means comprising two spaced elongate electrodes secured within said body and having externally exposed lower ends on a second pair of diametrically opposed axes that are parallel to said central axis, said pair of electrode elements having emergent exposure from said body at substantially said radial plane, said first diametrically opposed axes defining a first geometric plane and said second diametrically opposed axes defining a geometric plane that is approximately normal to said first geometric plane, and electronic means carried by the upper end of said body for operating said light source and said photocell, said electronic means being also connected to said electrodes for monitoring the instantaneous electrical-conductivity status of the environmental medium to which the lower ends of said electrodes are exposed.

7. The article of claim 6, in which said light source is a light-emitting diode.

8. The article of claim 6, in which separate optical fibers couple said light source and said photocell to said body on the respective alignments of said first diametrically opposed axes.

9. The article of claim 6, in which said electronic means and said light source and photo-cell are a single unitary subassembly, with separate output connections for remote-delivery.

10. The article of claim 9, in which said body is integrally united with said subassembly.

* * * * *